UNITED STATES PATENT OFFICE.

SAMUEL P. DUFFIELD, OF DETROIT, MICHIGAN.

IMPROVED SOLUBLE SILICATE.

Specification forming part of Letters Patent No. 41,978, dated March 22, 1864.

*To all whom it may concern:*

Be it known that I, SAMUEL P. DUFFIELD, of Detroit, in the county of Wayne and State of Michigan, have invented a new and useful Improvement in the Manufacture of Salt; and I do hereby declare that the following is a full and exact description thereof.

The chief object of my invention is the preparation of a cheap silicate for use in the manufacture of chloride of sodium or common salt from brines or salines containing chlorides of calcium or magnesium.

My invention consists in the manufacture of silicate of potash from common wood-ashes.

In the manufacture of this cheap silicate I prefer to take the ashes resulting from the combustion of wood in evaporating the salines—say one ton of such ashes—and mix the same intimately with about one-eighth to one-fourth ton of pure quartz sand, and then heat or flux this mixture in a reverberatory furnace until a chemical union takes place, forming a molten mass of silicate of potassa. This molten mass is then run off into a clean iron kettle and allowed to cool. Thus there is formed a soluble silicate of potash, which, being dissolved in water, is ready for use.

A trace of silicate of soda is usually present, arising from the common salt spilled into the ashes in evaporating the lime; but this does not practically injure the compound, as silicate of soda works equally well, and I have sometimes used a mixture of ashes and common salt, but I find this more expensive.

I have also made silicates from caustic alkalies and from their carbonates; but this is far less economical than the silicate made directly from wood-ashes.

The mode of using my new silicate is as follows: The brine containing chloride of calcium or of magnesium, or both, is treated with a solution of the silicate in the proportion of two parts of the dry silicate to one part of anhydrous chloride of calcium or magnesium. A chemical interchange or double decomposition takes place, there being formed silicate of lime, or of magnesia, or both, and also a chloride of potassa. The silicates of lime and magnesia being insoluble, they are precipitated, while the chloride of potassa remains in solution. After the precipitate subsides the solution of chloride of sodium is decanted or filtered off and then evaporated for the purpose of crystallization of the salt. The chloride of potassa remains in the mother-liquor, and is thus separated. This process also retains the iron, if any be present, with the silicate of lime and magnesia.

The use of my cheap silicate of potassa greatly lessens the expense of the manufacture of common salt, and at the same time enables the manufacturer to produce a very superior article.

While I am aware that the truths upon which my improvement is based are well known to science, I believe the application of the same to be new. I claim as a new and useful improvement in the arts the manufacture of the above-named silicate from common wood-ashes.

Having thus fully described my invention, what I claim, and desire to secure by Letters Patent of the United States, is—

The above-described silicate of potassa as a new article of manufacture, the same being made directly from ashes and sand, substantially as described.

SAMUEL P. DUFFIELD.

Witnesses:
G. BREED,
D. BREED.